(12) United States Patent
Minami et al.

(10) Patent No.: US 10,644,560 B2
(45) Date of Patent: May 5, 2020

(54) ROTARY ELECTRIC MACHINE

(71) Applicant: Mitsubishi Electric Corporation, Tokyo (JP)

(72) Inventors: Shinichiro Minami, Tokyo (JP); Kazunori Tanaka, Tokyo (JP); Kyoko Higashino, Tokyo (JP); Yoshihiro Shinosaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 53 days.

(21) Appl. No.: 15/766,863

(22) PCT Filed: Nov. 20, 2015

(86) PCT No.: PCT/JP2015/082739
§ 371 (c)(1),
(2) Date: Apr. 9, 2018

(87) PCT Pub. No.: WO2017/085873
PCT Pub. Date: May 26, 2017

(65) Prior Publication Data
US 2018/0294689 A1    Oct. 11, 2018

(51) Int. Cl.
*H02K 5/04* (2006.01)
*H02K 1/18* (2006.01)
*H02K 7/14* (2006.01)

(52) U.S. Cl.
CPC .............. *H02K 5/04* (2013.01); *H02K 1/185* (2013.01); *H02K 7/14* (2013.01)

(58) Field of Classification Search
CPC ............. H02K 5/04; H02K 7/14; H02K 1/185
(Continued)

(56) References Cited

U.S. PATENT DOCUMENTS

| 4,471,250 A | 9/1984 | Snider |
| 6,921,993 B2 * | 7/2005 | Xu .......................... H02K 1/146 |
| | | 310/216.045 |

(Continued)

FOREIGN PATENT DOCUMENTS

| EP | 2 131 476 A1 | 12/2009 |
| JP | 03-007641 U1 | 4/1991 |

(Continued)

OTHER PUBLICATIONS

The Extended European Search Report dated Nov. 7, 2018, issued by the European Patent Office in corresponding application No. 15908812.9.

(Continued)

*Primary Examiner* — Thomas Truong
(74) *Attorney, Agent, or Firm* — Sughrue Mion, PLLC; Richard C. Turner

(57) ABSTRACT

Provided is a rotary electric machine, including a pair of frames each including a cylindrical part, the cylindrical part having a fitting groove formed in an axial end portion, the pair of frames holding a stator core in an axial direction under a state in which both axial end portions of the stator core are each fitted in the fitting groove, the fitting groove having an axial surface having an annular shape opposed to an axial end surface of the stator core and a radial surface having a cylindrical shape opposed to an outer peripheral surface of the stator core, the radial surface having a recessed part recessed toward a radially outer side in a portion on the axial surface side, the cylindrical part having an inner peripheral surface opposed to a coil end, the inner peripheral surface having a large diameter part recessed toward the radially outer side.

3 Claims, 6 Drawing Sheets

(58) Field of Classification Search
USPC .......................................................... 310/89
See application file for complete search history.

(56) References Cited

U.S. PATENT DOCUMENTS

| | | | |
|---|---|---|---|
| 2002/0153794 A1 | 10/2002 | Kawasaki et al. | |
| 2005/0057107 A1 | 3/2005 | Xu et al. | |
| 2014/0021831 A1* | 1/2014 | Hayashi | H02K 5/22 310/432 |
| 2016/0190875 A1* | 6/2016 | Takemoto | G11B 19/2009 360/99.08 |
| 2016/0204669 A1 | 7/2016 | Tanaka | |

FOREIGN PATENT DOCUMENTS

| | | |
|---|---|---|
| JP | 04-295257 A | 10/1992 |
| JP | 3046409 U | 3/1998 |
| JP | 2002-315235 A | 10/2002 |
| JP | 2005-333712 A | 12/2005 |
| JP | 2010-252622 A | 11/2010 |
| JP | 5005354 B2 | 8/2012 |
| JP | 2012-244640 A | 12/2012 |
| JP | WO2015/063924 A1 | 5/2015 |

OTHER PUBLICATIONS

International Search Report of PCT/JP2015/082739 dated Feb. 9, 2016.
Communication dated Jan. 22, 2019 from Japanese Patent Office in counterpart JP Application No. 2017-551497.

* cited by examiner

ROTARY ELECTRIC MACHINE

CROSS REFERENCE TO RELATED APPLICATIONS

This application is a National Stage of International Application No. PCT/JP2015/082739 filed Nov. 20, 2015.

TECHNICAL FIELD

The present invention relates to a rotary electric machine to be mounted to, for example, a passenger vehicle or a truck.

BACKGROUND ART

There has hitherto been known a rotary electric machine, which includes: a stator including a stator core having a cylindrical shape and a stator coil arranged in the stator core; and a pair of frames each including a cylindrical part, the cylindrical part having a fitting groove formed in an axial end portion over an entire circumference, in which axial end portions of the stator core are each fitted, the pair of frames holding the stator core in an axial direction under a state in which both the axial end portions of the stator core are each fitted in the fitting groove of the cylindrical part, the fitting groove having an axial surface having an annular shape opposed to an axial end surface of the stator core and a radial surface having a cylindrical shape opposed to an outer peripheral surface of the stator core, the radial surface being formed continuously from a radially outer port ion of the axial surface (see, for example, Patent Literature 1).

CITATION LIST

Patent Literature

[PTL 1] JP 5005354 B2

SUMMARY OF INVENTION

Technical Problem

However, when the radial dimension of the frame is reduced, and further, a large diameter part recessed toward a radially outer side is formed in a portion of the frame opposed to a coil end in order to downsize the rotary electric machine while sufficiently ensuring the dimension between the coil end and the frame to achieve insulation therebetween, the contact area between the axial end surface of the stator core and the axial surface of the fitting groove is reduced. Further, a curved portion is microscopically formed at a corner between the axial surface and the radial surface of the fitting groove, and hence the contact area between the axial end surface of the stator core and the axial surface of the fitting groove is further reduced. As a result, there is a problem in that close contact between the stator core and the frame is degraded.

The present invention provides a rotary electric machine capable of being downsized and more reliably ensuring close contact between a stator core and a frame.

Solution to Problem

According to one embodiment of the present invention, there is provided a rotary electric machine, including: a stator including a stator core having a cylindrical shape and a stator coil arranged in the stator core; and a pair of frames each including a cylindrical part, the cylindrical part having a fitting groove formed in an axial end portion over an entire circumference, in which axial end portions of the stator core are each fitted, the pair of frames holding the stator core in an axial direction under a state in which both the axial end portions of the stator core are each fitted in the fitting groove of the cylindrical part, the fitting groove having an axial surface having an annular shape opposed to an axial end surface of the stator core and a radial surface having a cylindrical shape opposed to an outer peripheral surface of the stator core, the radial surface being formed continuously from a radially outer portion of the axial surface, the radial surface having a recessed part recessed toward a radially outer side over the entire circumference in a portion on the axial surface side, the frame having an inner peripheral surface opposed to a coil end being a portion of the stator coil exposed from the axial end portion of the stator core, the inner peripheral surface having a large diameter part recessed toward the radially outer side.

Advantageous Effects of Invention

With the rotary electric machine according to one embodiment of the present invention, the recessed part recessed toward the radially outer side is formed over the entire circumference in the portion of the radial surface on the axial surface side, and the large diameter part recessed toward the radially outer side is formed on the inner peripheral surface of the frame opposed to the coil end being the portion of the stator coil exposed from the axial end portion of the stator core. Therefore, the rotary electric machine can be downsized, and the close contact between the stator core and the frame can also be more reliably ensured.

DESCRIPTION OF EMBODIMENTS

First Embodiment

Figure 1:
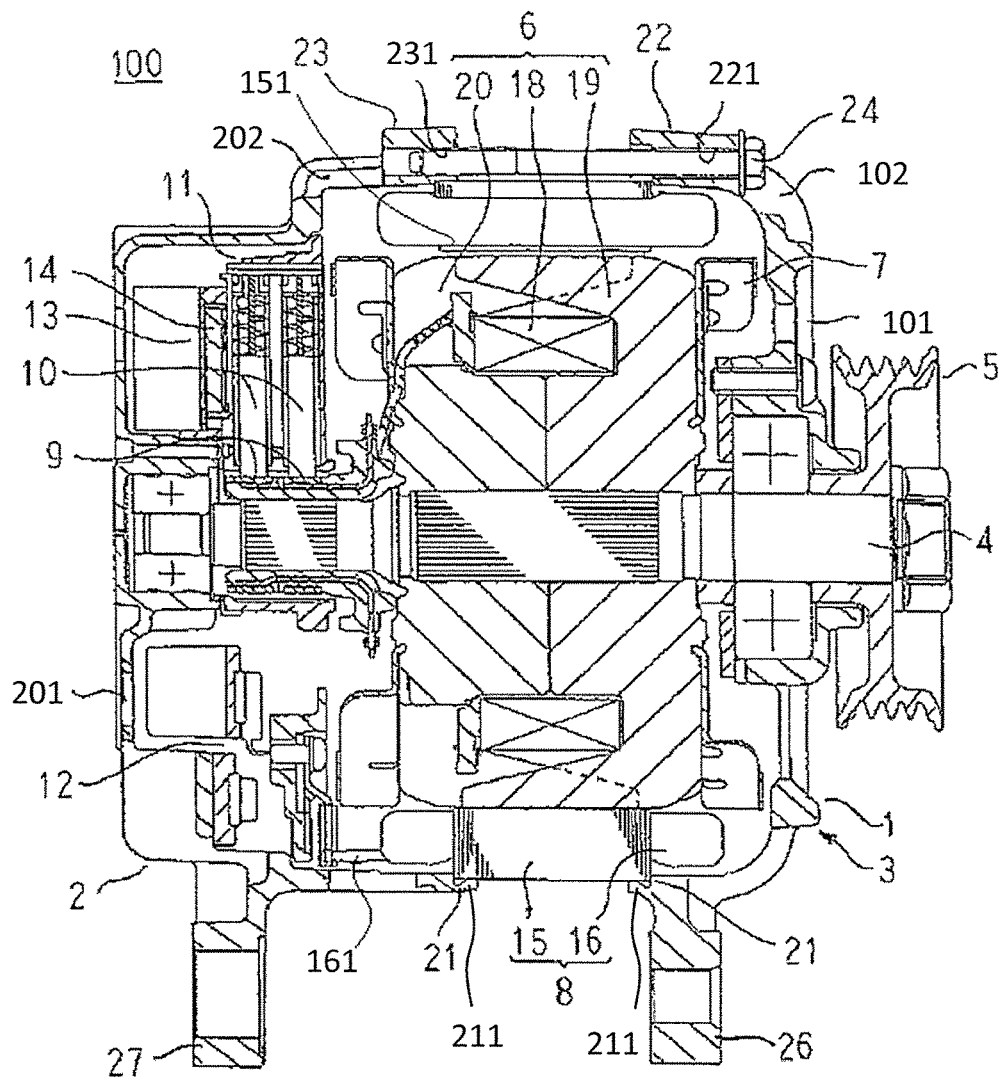
FIG. 1 is a vertical sectional view for illustrating a rotary electric machine for a vehicle according to a first embodiment of the present invention.

FIG. 1 is a vertical sectional view for illustrating a rotary electric machine for a vehicle according to a first embodiment of the present invention. In the first embodiment, as the rotary electric machine, a rotary electric machine 100 for a vehicle is described as an example. The rotary electric machine 100 for a vehicle includes a case 3 formed of a front bracket 1 and a rear bracket 2 each serving as a frame formed into a bowl shape, a shaft 4 that is supported in a rotatable manner by the case 3, a pulley 5 that is firmly fixed to a portion of the shaft. 4 protruding outward from the front bracket 1, a rotator 6 that is fixed to the shaft 4 and accommodated on an inner side of the case 3, and a fan 7 that is fixed to both axial end surfaces of the rotor 6. The front bracket 1 and the rear bracket 2 are made of aluminum. The front bracket 1 and the rear bracket 2 may be made of a material other than aluminum.

The rotary electric machine 100 for a vehicle further includes a stator 8 that is fixed to an inner wall surface of the case 3 so as to surround an outer periphery of the rotor 6, a slip ring 9 that is fixed to a portion of the shaft 4 on the rear bracket 2 side and configured to supply a current to the rotor 6, a pair of brushes 10 that are arranged on the inner side of the case 3 and slide on the slip ring 9, a brush holder 11 configured to accommodate the brushes 10, a rectifier 12 that is electrically connected to the stator 8 and configured to rectify an AC current generated in the stator 8 to a DC current, a heatsink 13 fixed to the brush holder 11, and a regulator 14 that is bonded to the heatsink 13 and configured to adjust the magnitude of a voltage of the AC current generated in the stator 8.

The stator 8 includes a stator core 15 having a cylindrical shape and a stator coil 16 arranged in the stator core 15. The stator core 15 has a plurality of slots 151 formed so as to extend in the axial direction. An opening of each of the slots 151 faces radially inward. The plurality of slots 151 are arranged with an equiangular pitch in a circumferential direction at a ratio of 2 for each pole and for each phase.

Figure 2:
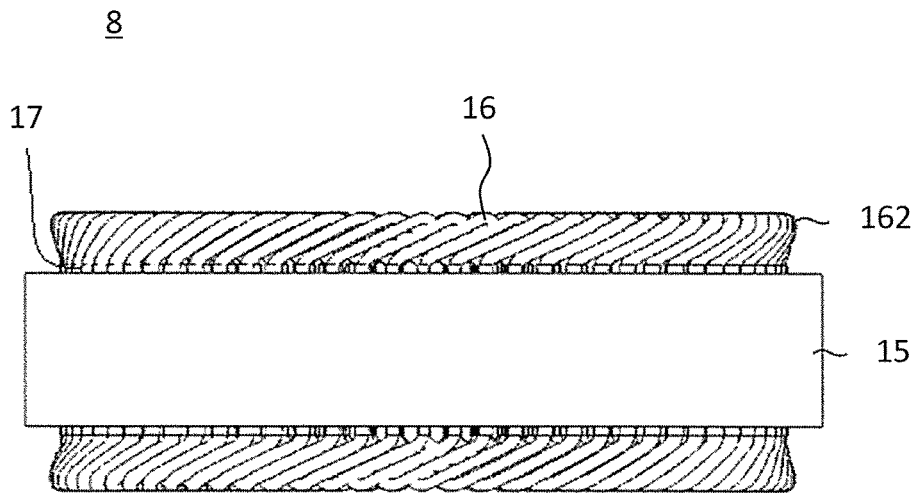
FIG. 2 is a side view for illustrating a stator of FIG. 1.

FIG. 2 is a side view for illustrating the stator 8 of FIG. 1. The stator 8 includes insulators 17 provided on the stator core 15. The insulators 17 are arranged in the slots 151 to ensure insulation between the stator core 15 and the stator coil 16. The stator coil 16 includes a coil end 162 being a portion exposed from an axial end portion of the stator core.

The stator coil 16 is formed of a three-phase AC winding. Winding end portions 161 of the stator coil 16 are each electrically connected to the rectifier 12.

As illustrated in FIG. 1, the rotor 6 includes a field winding 18 configured to cause a current to flow to generate a magnetic flux, and a first pole core 19 and a second pole core 20 that are each arranged so as to cover the field winding 18 and have a magnetic pole formed by the magnetic flux.

The front bracket 1 and the rear bracket 2 each include a cylindrical part 211 having a fitting groove 21 formed in an axial end portion over an entire circumference, in which axial end portions of the stator core 15 are each fitted. The fitting groove 21 has an L-shape in cross section. The fitting groove 21 is formed on an inner peripheral side of the cylindrical part 211.

A plurality of front-side flange parts 22 are formed on an outer peripheral side of the cylindrical part 211 of the front bracket 1. The front-side flange parts 22 protrude toward a radially outer side from the cylindrical part 211, A plurality of rear-side flange parts 23 are formed on an outer peripheral side of the cylindrical part 211 of the rear bracket 2. The rear-side flange parts 23 protrude toward the radially outer side from the cylindrical part 211. The front-side flange parts 22 and the rear-side flange parts 23 are arranged so as to be opposed to each other in the axial direction.

The front-side flange parts 22 each have a bolt hole 221. The rear-side flange parts 23 each have a screw hole 231.

Figure 3:
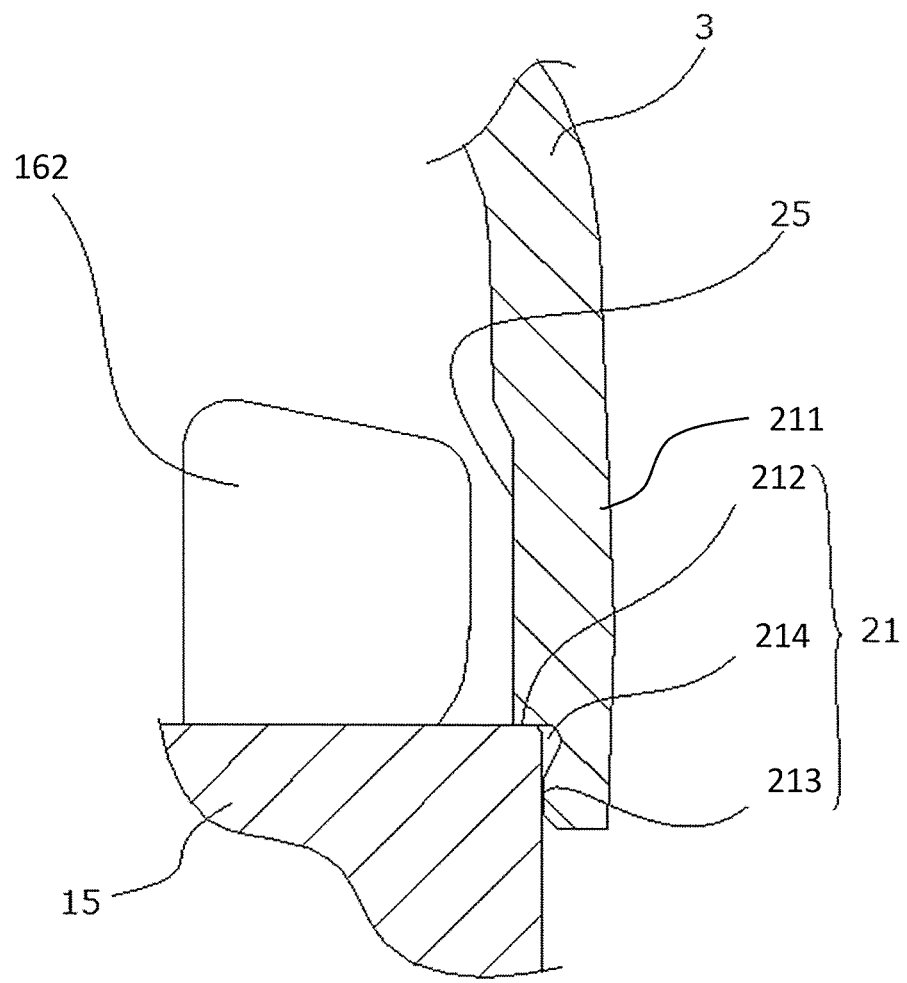
FIG. 3 is an enlarged view for illustrating main parts of the rotary electric machine for a vehicle of FIG. 1.

FIG. 3 is an enlarged view for illustrating main parts of the rotary electric machine 100 for a vehicle of FIG. 1, The fitting groove 21 includes an axial surface 212 having an annular shape opposed to an axial end surface of the stator core 15 and a radial surface 213 having a cylindrical shape, which is formed continuously from a radially outer portion of the axial surface 212 and opposed to an outer peripheral surface of the stator core 15. The axial surface 212 has a flat surface orthogonal to an axis line of the shaft 4. The radial surface 213 has a cylindrical surface with the axis line of the shaft 4 being the center.

A recessed part 214 recessed toward the radially outer side is formed over the entire circumference in a portion of the radial surface 213 on the axial surface 212 side. Through formation of the recessed part 214 on the radial surface 213, when the axial surface 212 and the radial surface 213 are formed with a jig, a corner between the axial surface 212 and the radial surface 213 is shifted to the radially outer side. With this, the axial surface 212 is formed so as to extend on the radially outer side.

A large diameter part 25 recessed toward the radially outer side is formed on an inner peripheral surface of the case 3 opposed to the coil end 162 being a portion of the stator coil exposed from the axial end portion of the stator core 15. The large diameter part 25 is formed on an inner peripheral surface of the cylindrical part 211.

As illustrated in FIG. 1, both the axial end portions of the stator core 15 are fitted in the fitting groove 21 of the front bracket 1 and the fitting groove 21 of the rear bracket 2, respectively, from axially outer sides, and a through bolt 24 inserted in the bolt hole 221 is fastened to the screw hole 231, with the result that the stator 8 is held by the case 3 under a pressure in the axial direction. In this case, an outer peripheral edge portion of each of the axial end portions of the stator core is brought into close contact with the axial surface 212 of the fitting groove 21 over the entire circumference with a constraint force between a thrust force of the fastening force of the through bolt 24 and a reaction force thereof. Further, both axial end portions of the outer peripheral surface of the stator core 15 are each engaged with the radial surface 213 of the fitting groove 21, and thus the movement of the stator 8 in the radial direction is regulated.

The stator 8 is reduced in diameter and size, and as illustrated in FIG. 2, the stator coil 16 accommodated in the slots 151 at high density protrudes toward the radially outer side at the coil end 162 exposed from each of both the axial end portions of the stator core 15. The rotor 6 is arranged on an inner peripheral side of the stator 8 with a minute gap, and hence the coil end 162 cannot protrude toward the inner peripheral side of the stator 8. As illustrated in FIG. 3, a portion of each of the front bracket 1 and the rear bracket facing an outer peripheral side of the protruding coil end 162 has the large diameter part 25.

When a required clearance is ensured between the coil end 162 and the front bracket 1 and between the coil end 162 and the rear bracket 2 while the radial dimension of the front bracket 1 and the rear bracket 2 is reduced without forming the large diameter part 25 in the front bracket. 1 or the rear bracket 2, the entire thickness of the front bracket 1 and the rear bracket is reduced. With this, the stiffness of the front bracket 1 and the rear bracket 2 is significantly decreased. Meanwhile, in the present invention, the large diameter part 25 is formed in each of the front bracket 1 and the rear bracket 2. Therefore, even when a required clearance is ensured between the coil end 162 and the front bracket 1 and between the coil end 162 and the rear bracket 2 while the radial dimension of the front bracket 1 and the rear bracket 2 is reduced, the thickness of a portion other than the large diameter part 25 of each of the front bracket 1 and the rear bracket 2 is maintained. With this, the decrease in stiffness of the front bracket 1 and the rear bracket 2 can be suppressed.

When each of inner peripheral surfaces of the front bracket 1 and the rear bracket 2 facing the coil end 162 is used as a casted surface without being processed, through formation of the large diameter part 25 in each of the front bracket. 1 and the rear bracket 2, an insulation distance between the coil end 162 and each of the front bracket 1 and the rear bracket 2, which is reduced by a draft, can be increased, or an overlap allowance between each of the axial surfaces 212 of the front bracket 1 and the rear bracket 2 and the axial end surface of the stator core 15, which is reduced by a draft, can be increased.

The insulation distance between each of the front bracket 1 and the rear bracket 2 and the coil end 162 is approximately set to, for example, 1 mm or more. Regarding round chamfering of the above-mentioned corner between the axial surface 212 and the radial surface 213 that are formed with the jig, 0.5 mm is considered as a maximum value. The range of the recessed part 214 is defined so that the shape of the corner falls within a region of the recessed part 214, and hence the stator core 15 to be fitted and the corner between the axial surface 212 and the radial surface 213 do not interfere with each other. When the axial surface 212 is formed more largely, the durability of the rotary electric machine 100 for a vehicle is improved.

Next, operation is described in the rotary electric machine 100 for a vehicle constructed as described above, a current is supplied from a battery (not shown) to the field winding 18 through the brushes 10 and the slip ring 9, With this, a magnetic flux is generated, and the first pole core 19 and the second pole core 20 are excited to an N-pole and an S-pole, respectively.

Meanwhile, when the pulley 5 is driven to rotate by an engine, the rotator 6 rotates together with the shaft 4, With this, a rotation magnetic field is given to the stator coil 16 to generate an electromotive force. This AC electromotive force is rectified to a DC current through the rectifier 12 and charged to the battery after the magnitude of the voltage thereof is adjusted by the regulator 14.

Further, the fan 7 rotates in synchronization with the rotation of the rotator 6, When the fan 7 rotates, air is sucked into an inside of the case 3 through an intake hole 101 formed in the axial end portion of the front bracket 1 and an intake hole 201 formed in the axial end portion of the rear bracket 2. The air sucked into the inside of the case 3 flows to the rotator 6 in the axial direction and is bent in a centrifugal direction by the fan 7. After that, the air is exhausted outside from the case 3 through an exhaust hole 102 formed in the front bracket 1 and an exhaust hole 202 formed in the rear bracket 2. The exhaust hole 102 is formed in a side portion of the front bracket 1, which is adjacent to the coil end 162. The exhaust hole 202 is formed in a side portion of the rear bracket 2, which is adjacent to the coil end 162. Heat generating components such as the rectifier 12, the regulator 14, and the stator coil 16 are cooled by the flow of the air passing through the inside of the case 3.

Both the axial end portions of the stator core 15 are held by the axial surfaces 212 of the fitting grooves 21 of the front bracket. 1 and the rear bracket 2 under a pressure in the axial direction with the fastening force of the throughbolt 24. Therefore, even when the axial end surface of the stator core 15 does not have complete flatness, and the axial end surface of the stator core 15 and the axial surface 212 are not completely parallel to each other, the axial end surface of the stator core 15 and the axial surface 212 can be brought into close contact with each other, A dimension appropriate for holding the stator 8 is ensured in the axial surface 212, and hence trouble, for example, detachment of the stator 8 from the case 3 at the time of being installed in a vehicle can be avoided. Further, even when salt water or mud water enters the rotary electric machine 100 for a vehicle through the exhaust hole 102 or the exhaust hole 202, the salt water or the mud water does not enter a region between the axial end surface of the stator core 15 and the axial surface 212. With this, formation of a leak path between the stator coil 16 configured to generate a phase current and the case 3 being grounded is suppressed, and occurrence of insulation failure can be suppressed.

The axial end surface of the stator core 15 and the axial surface 212 of the fitting groove 21 are brought into contact with each other through metal surfaces. Further, the axial end surface of the stator core 15 and the axial surface 212 are in a close contact state with the fastening force of the through bolt 24. With this, the contact thermal resistance between the axial end surface of the stator core 15 and the axial surface 212 is significantly reduced. As a result, heat generated in the stator coil 16 is efficiently transmitted to the case 3 through the stator core 15, and the heat is radiated from the surface of the case 3 having a large surface area, with the result that an increase in temperature of the stator 8 can be suppressed.

Figure 4:
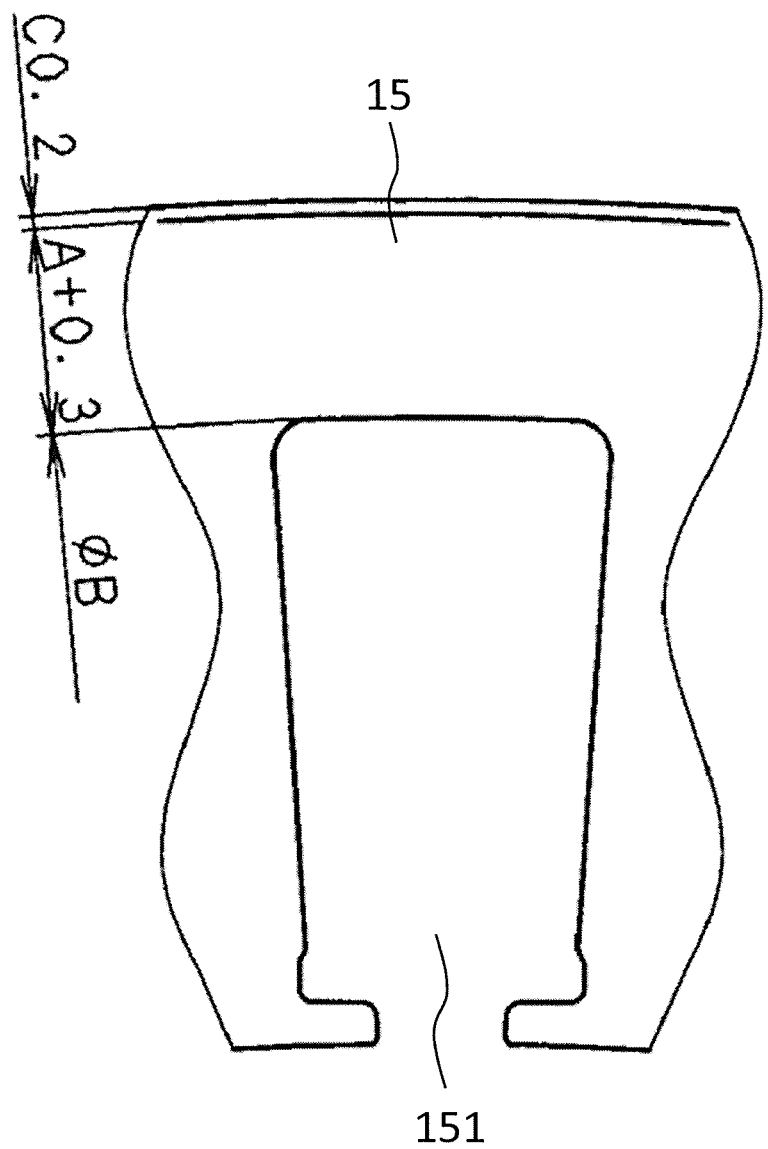
FIG. 4 is a plan view for illustrating a stator core of FIG. 3.
Figure 5:
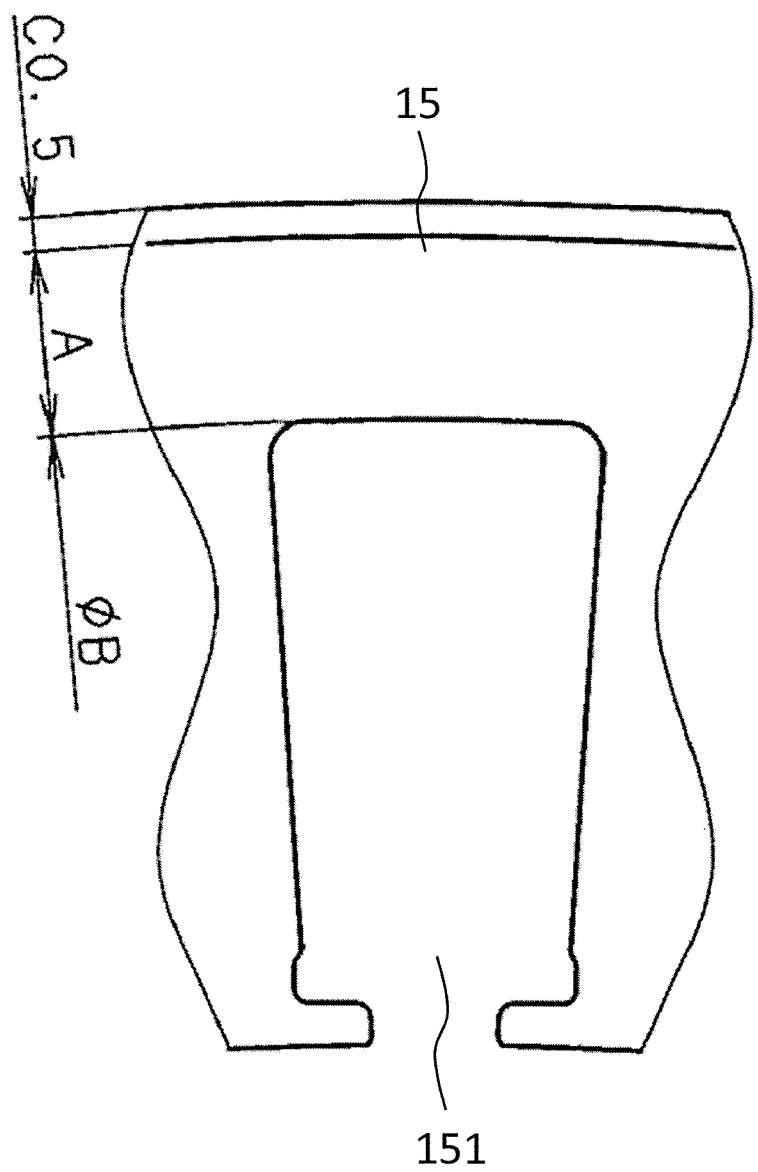
FIG. 5 is a plan view for illustrating a related-art stator core.

FIG. 4 is a plan view for illustrating the stator core 15 of FIG. 3, and FIG. 5 is a plan view of a related-art stator core 15 in the related-art stator core 15, in order to avoid interference between the stator core 15 and the corner of the fitting groove 21 of the case 3, the stator core is subjected to chamfering of C0.5. In the present invention, through arrangement of the recessed part 214 in the fitting groove 21 of each of the front bracket 1 and the rear bracket 2, the interference between the corner of the fitting groove 21 and the stator core 15 can be avoided. With this, chamfering of the stator core 15 can be minimized. For example, it is possible to subject the stator core 15 to light chamfering of about C0.2 by removing an unnecessary processing burr in a corner of each axial end portion being the outer peripheral surface of the stator core 15. As a result, the radial dimension of a portion of the axial end surface of the stator core 15 that is brought into surface contact with the axial surface 212 can be increased, and the area of the portion of the axial end surface of the stator core 15 that is brought into surface contact with the axial surface 212 can be increased. With this, the radial dimension of the front bracket 1 and the rear bracket 2 can be reduced without decreasing the close contact between the stator core 15 and each of the front bracket 1 and the rear bracket 2.

Figure 6:
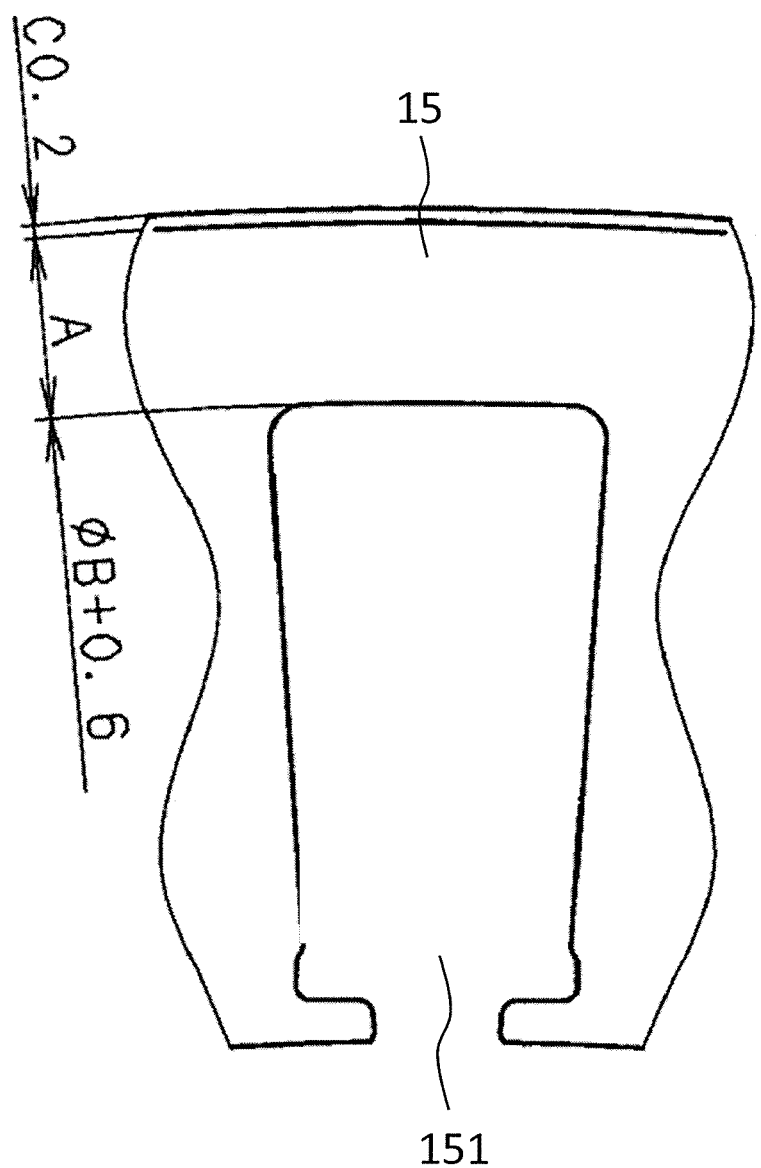
FIG. 6 is a plan view for illustrating a modification example of the stator core of FIG. 4.

FIG. 6 is a plan view for illustrating a modification example of the stator core 15 of FIG. 4. Chamfering of the stator core 15 is reduced, and hence the bottom position of the slot 151 can be enlarged on the radially outer side as long as a required minimum of a radial close contact distance being the radial dimension of the contact surface between the axial surface 212 having an annular shape and the axial end surface of the stator core 15 is ensured. With this, the slot area of the slot. 151 can be increased. As a result, a coil having a larger wire diameter can be inserted in the slot 151, and the output characteristics of the rotary electric machine 100 for a vehicle can be improved.

Figure 7:
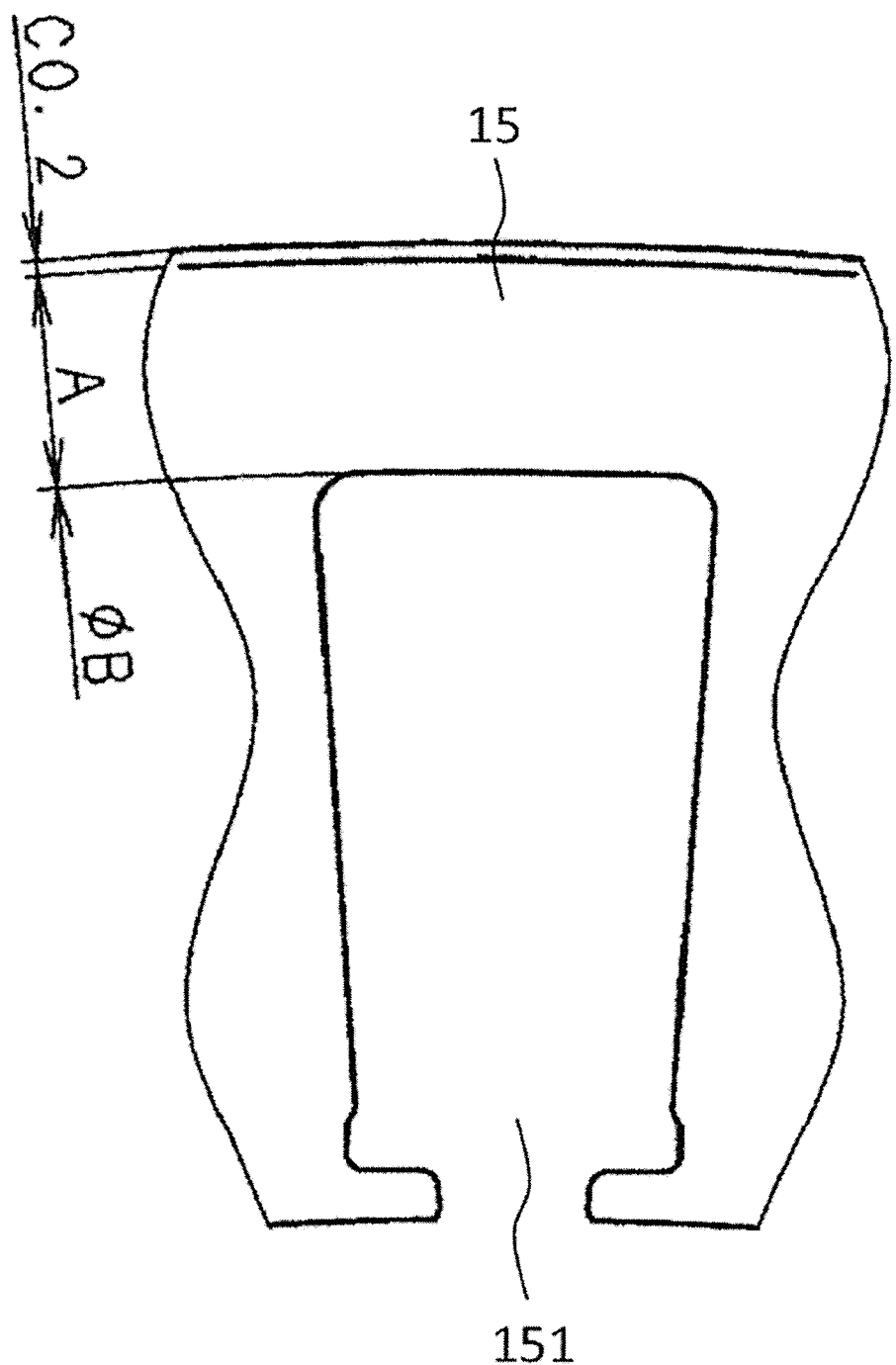
FIG. 7 is a plan view for illustrating a modification example of the stator core of FIG. 4.

FIG. 7 is a plan view for illustrating a modification example of the stator core 15 of FIG. 4. Chamfering of the stator core 15 is reduced, and hence the radial dimension of the stator core 15 can be reduced as long as a required minimum of a radial close contact distance being the radial dimension of the contact surface between the axial surface 212 having an annular shape and the axial end surface of the stator core 15 is ensured. As a result, the radial dimension of the front bracket 1 and the rear bracket 2 can be further reduced, and the rotary electric machine 100 for a vehicle can be further downsized.

As described above, the rotary electric machine 100 for a vehicle according to the first embodiment of the present invention includes: the stator 8 including the stator core 15 having a cylindrical shape and the stator coil 16 arranged in the stator core 15; and a pair of frames each including the cylindrical part 211, the cylindrical part 211 having the fitting groove 21 formed in the axial end portion over the entire circumference, in which the axial end portions of the stator core 15 are each fitted, the pair of frames holding the stator core 15 in the axial direction under a state in which both the axial end portions of the stator core 15 are each fitted in the fitting groove 21 of the cylindrical part 211. Each fitting groove 21 has the axial surface 212 having an annular shape opposed to an axial end surface of the stator core 15 and a radial surface 213 having a cylindrical shape opposed to an outer peripheral surface of the stator core 15, the radial surface 213 being formed continuously from a radially outer portion of the axial surface 212. The radial surface 213 has the recessed part 214 recessed toward the radially outer side over the entire circumference in a portion on the axial surface 212 side, and the frame has an inner peripheral surface opposed to the coil end 162 being a portion of the stator coil 16 exposed from the axial end portion of the stator core 15, the inner peripheral surface having the large diameter part 25 recessed toward the radially outer side. Therefore, the rotary electric machine 100 for a vehicle can be downsized, and the close contact between the stator core 15 and the frame can be further ensured.

Further, the large diameter part 25 is formed on the cylindrical part 211, and hence the large diameter part 25 can be easily formed.

Further, the large diameter part 25 is formed continuously from the axial surface 212, and hence the large diameter part 25 can be easily formed.

In the above-mentioned first embodiment, description is given of the configuration in which the slip ring 9, the brushes 10, the brush holder 11, the rectifier 12, the heatsink 13, and the regulator 14 are arranged on an inner side of the rear bracket 2. However, those components may be covered with a resin cover and arranged on an outer side of the rear bracket 2.

Further, in the above-mentioned first embodiment, the rotary electric machine 100 for a vehicle is described as an example, but a power generator for a vehicle or an AC electric motor for a vehicle may be used.

Further, in the above-mentioned first embodiment, description is given of the configuration in which the stator coil 16 is formed of a three-phase AC winding, and the slots 151 configured to accommodate the stator coil 16 are arranged with an equiangular pitch in a circumferential direction at a ratio of 2 for each pole and for each phase. However, the present invention is not limited to this configuration. For example, the stator coil may be formed of one AC winding, and the slots may be arranged at a ratio of 1 for each pole and for each phase.

The invention claimed is:

1. A rotary electric machine, comprising:
   a stator including a stator core having a cylindrical shape and a stator coil arranged in the stator core; and
   a pair of frames each including a cylindrical part, the cylindrical part having a fitting groove formed in an axial end portion over an entire circumference, in which axial end portions of the stator core are each fitted, the pair of frames holding the stator core in an axial direction under a state in which both the axial end portions of the stator core are each fitted in the fitting groove of the cylindrical part,
   the fitting groove having an axial surface having an annular shape opposed to an axial end surface of the stator core and a radial surface having a cylindrical shape opposed to an outer peripheral surface of the stator core, the radial surface being formed continuously from a radially outer portion of the axial surface,
   the radial surface having a recessed part recessed toward a radially outer side over the entire circumference in a portion on the axial surface side,
   each of the pair of frames having an inner peripheral surface extending in the axial direction, the inner peripheral surface having a large diameter part recessed toward the radially outer side that is opposed to a coil end being a portion of the stator coil exposed from the axial end portion of the stator core,
   wherein a diameter of the large diameter part is larger than a diameter of a portion of the inner peripheral surface of each of the pair of frames that is not opposed to the coil end.

2. A rotary electric machine according to claim 1, wherein the large diameter part is formed on an inner peripheral surface of the cylindrical part.

3. A rotary electric machine according to claim 1, wherein the large diameter part is formed continuously from the axial surface.

* * * * *